June 22, 1937.　　　C. J. DOCKRAY ET AL　　　2,084,794
GLASS MOLD
Original Filed Jan. 2, 1935

Inventors
Charles J. Dockray.
Harry J. Dockray.

By Lacey & Lacey,
Attorneys

Patented June 22, 1937

2,084,794

UNITED STATES PATENT OFFICE 2,084,794

GLASS MOLD

Charles J. Dockray and Harry J. Dockray, Zanesville, Ohio

Original application January 2, 1935, Serial No. 146. Divided and this application July 10, 1935, Serial No. 30,710

6 Claims. (Cl. 49—65)

This invention relates to glass molds of that general class shown and described in our copending application, Serial No. 146, filed in the United States Patent Office on the 2nd day of January, 1935, and of which the present application is a division.

Heretofore, considerable difficulty has been experienced in obtaining a uniform density or fineness of the grain of the metal constituting the glass mold, this being due to the fact that when the metal is poured into the sand mold, the molten metal at the bottom of the sand mold tends to heat the chill with the result that the metal at the upper portion of the sand mold cavity is often of an open grain or porous nature instead of presenting a dense close texture.

Such flaws or defects in the metal are seldom detected until the glass mold is reamed or finished preparatory for use, and as it is essential that the walls of the glass mold cavity be free from pores or pits to produce the best results, it follows that such defective castings must be discarded which not only entails loss of time but also the expense of casting and finishing a replacement mold.

Furthermore, when the walls of the glass mold are relatively thin, the heat from molten glass poured into the mold cavity soon causes the mold to become excessively hot which necessitates either cooling the mold at frequent intervals or replacing the heated mold with a new one.

The object of the present invention is to overcome these objectionable features by providing a casting, the construction of which is such that the walls of the glass mold cavity will present a uniformly dense fine grain throughout the entire effective molding area thereof, and to make the walls of the cavity of sufficient thickness or mass volume to take up and uniformly distribute the heat throughout the mass of metal during the molding of glass articles, thereby to increase the effective life of the glass mold.

A further object of the invention is to provide a glass mold or casting, the walls of which are of uniform density and free from superficial pits or pores, said casting having a reinforcing member surrounding the mold chamber and embedded in and forming a permanent part of the casting.

A further object is to provide means for permitting the passage of heat through the reinforcing member when the mold is used for forming tumblers, bottles and other glassware.

Figure 1:
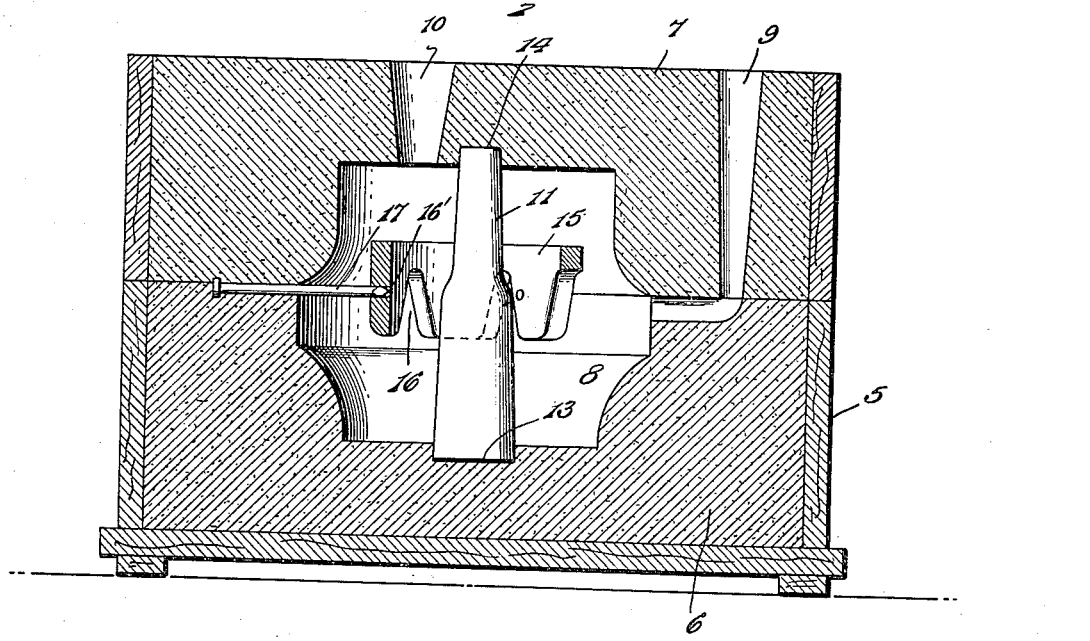

In the accompanying drawing forming a part of this specification in which similar numerals of reference indicate corresponding parts in all the figures of the drawing, Figure 1 is a vertical sectional view of a molding apparatus showing the manner of forming a glass mold or casting.

Figure 2:
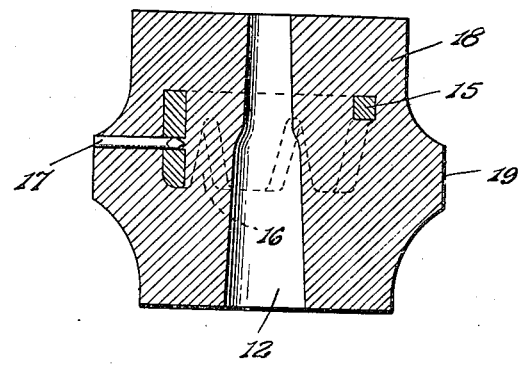

Figure 2 is a vertical sectional view of the completed glass mold or casting.

In carrying the present invention into effect, we provide a molding flask 5 including a drag 6 and a cope 7, the parts being freely separable and adapted to be fastened together in any suitable manner during the casting operation. After the flask has been set up, a pattern, not shown, of the size and configuration of the mold or casting to be produced is placed within the sand and subsequently withdrawn to produce a shaping cavity 8 adapted to receive molten metal through a gate 9, the cope 7 being provided with the usual header 10 to allow for shrinkage of the metal during the casting operation. Disposed within the cavity 8 is a main or central chill 11 of a shape and size conforming to the shape and size of the cavity 12 to be formed in the casting, and the upper and lower ends of this central chill are preferably seated in centering sockets 13 and 14 so as to prevent displacement of the chill when pouring the molten metal. Surrounding the main chill, preferably near the upper portion thereof, and spaced laterally therefrom is an auxiliary chill 15, preferably annular in shape, and having its lower edge cut away to form recesses 16, preferably substantially V-shaped, and this auxiliary chill 15 serves to prevent overheating of the main chill by absorbing a portion of the heat from the molten metal so as to maintain the central chill 11 at a uniform cool temperature throughout its entire height and thus produce a fine close grain at the walls of the glass mold cavity 12. The auxiliary chill 15 may be suspended within the shaping cavity 8 in any suitable manner, as, for instance, by lugs on the auxiliary chill, but it is preferred to provide said auxiliary chill with spaced transverse openings 16' adapted to receive chaplets or anchoring pins 17 which latter or the lugs may, if desired, rest on the sand at the junction of the drag and cope of the flask, as best shown in Figure 1 of the drawing.

In operation, the main or central chill 11 and the outer or auxiliary chill 15 are positioned within the shaping cavity 8, as best shown in Figure 1 of the drawing, after which the molten metal is introduced through the gate 9 in the usual manner. As the molten metal fills the bottom of the cavity 8, a portion of the heat from the molten metal will be absorbed by the auxiliary chill 15 so that the walls of the glass mold at the cavity 12 will be uniformly chilled throughout their entire effective area and thus cause the metal at said walls to present a fine close or dense grain necessary to obtain the best results in molding glass articles.

It will thus be seen that this auxiliary chill 15 prevents overheating of the main chill and consequently prevents the metal around the walls of the glass mold chamber 12 from becoming porous or pitted, which generally occurs where but a single chill is employed. In other words, the auxiliary chill 15 prevents premature heating of the upper portion of the main chill and thus insures an even close grain texture of the metal throughout the entire height of the glass mold chamber. After the pouring operation, the flask is disassembled and the completed casting, indicated at 18, removed therefrom leaving the auxiliary chill 15 embedded in the casting and forming a permanent reinforcing member therefor.

The pins, lugs or other suspending elements 17 are then cut or otherwise severed flush with the outer surface of the casting 18 and the latter shipped to the glass factory where the cavity 12 is reamed out or finished.

It is impossible to determine whether the metal at the walls of the glass mold cavity is porous or otherwise defective until the mold cavity is reamed or otherwise finished as said pores are exposed only during the finishing operation and should the metal at the molding surface of any of the castings be more or less porous, said castings cannot be used and are a total loss, and the present invention obviates this loss and the expense incident thereto.

Attention is here called to the fact that the walls of the glass mold or casting 18 are relatively thick and massive, and are further reinforced and strengthened by an intermediate annular enlargement 19, while the auxiliary chill or reinforcing member 15 is embedded in the metal at said annular reinforcement and forms a permanent part of the glass mold or casting so that when molten glass is introduced within the mold cavity 12, the heat from the glass will pass through the metal at the openings 16 in the reinforcing member 15 and be uniformly distributed throughout the entire mass of metal constituting the casting and thus permit the use of the mold for an indefinite period without shutting down operations to effect cooling thereof or replacement of the mold due to the excessive heat conditions.

It will thus be seen that the auxiliary chill 15 not only serves to prevent porosity of the metal but also serves to reinforce the finished glass mold or casting and insures an even distribution of heat throughout the mass of metal constituting the mold during the molding of tumblers, bottles, or other glassware.

It will, of course, be understood that the auxiliary chills or reinforcing members may be made in different shapes and sizes according to the specific purpose for which the mold or casting is to be employed, the essential feature of the invention residing in the employment of an auxiliary chill to prevent overheating of the main chill and thus insure a dense and satisfactory close grain in the casting and which auxiliary chill is embedded in and forms a permanent reinforcing member for the finished glass mold or casting.

Having thus described the invention, what is claimed as new is:

1. A mold for making glass articles which consists of a casting having a mold chamber therein and provided with a reinforcing member surrounding the mold chamber and embedded in and forming a permanent part of the casting.

2. A mold for making glass articles comprising a casting having a mold chamber and provided with a reinforcing member encircling the mold chamber and embedded in the casting, said reinforcing member being provided with openings receiving the metal constituting the casting.

3. A mold for making glass articles comprising a casting having a mold chamber and provided with circumscribing walls of greater thickness than the width of the mold chamber, and a reinforcing member surrounding the mold chamber and embedded in the casting, said reinforcing member having recesses to receive the metal constituting the casting.

4. A mold for making glass articles comprising a casting having a mold chamber and provided with a reinforcing member encircling the mold chamber and embedded in the casting, said reinforcing member having its lower edge scalloped to form openings receiving the metal constituting the casting.

5. A mold for making glass articles comprising a casting having a vertical mold chamber therein and opening through the top and bottom thereof, said casting being provided with an intermediate circumferential thickened portion, and an annular reinforcing member surrounding the mold chamber at said thickened portion and embedded in and forming a permanent part of the casting, said reinforcing member being provided with openings receiving the metal constituting the casting.

6. A mold for making glass articles comprising a substantially cylindrical casting having a vertical mold chamber formed therein and opening through the top and bottom thereof, said casting being provided with an intermediate circumferentially thickened portion, an annular perforated reinforcing member surrounding the mold chamber at said thickened portion and embedded in and forming a permanent part of the casting, the lower edge of the reinforcing member being scalloped, and pins having their inner ends extended within the perforations of the reinforcing member and their outer ends disposed flush with the outer surface of the circumferential thickened portion.

CHARLES J. DOCKRAY.
HARRY J. DOCKRAY.